United States Patent
Atobe

(10) Patent No.: US 6,309,204 B1
(45) Date of Patent: Oct. 30, 2001

(54) APPARATUS FOR MANUFACTURING DISC SUBSTRATE

(75) Inventor: Hiroki Atobe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/081,008

(22) Filed: May 19, 1998

(30) Foreign Application Priority Data

May 20, 1997 (JP) .................................................... 9-129960

(51) Int. Cl.[7] .................................................. B23K 26/08
(52) U.S. Cl. ....................... 425/174.4; 425/385; 425/400; 425/806; 425/810; 264/400; 264/482; 264/161
(58) Field of Search .................................... 264/400, 482, 264/161, 106; 425/174.4, 806, 810, 385, 400; 428/64.1

(56) References Cited

U.S. PATENT DOCUMENTS

| | | | |
|---|---|---|---|
| 4,563,824 | * | 1/1986 | Baun ....................................... 33/568 |
| 4,752,648 | * | 6/1988 | Rosenfield et al. .............. 219/121.65 |
| 4,780,590 | * | 10/1988 | Griner et al. .................... 219/121.65 |
| 4,827,469 | * | 5/1989 | Peeters .................................. 369/282 |
| 4,995,799 | * | 2/1991 | Hayashi et al. ........................ 425/111 |
| 5,062,021 | * | 10/1991 | Ranjan et al. ......................... 360/135 |
| 5,132,510 | * | 7/1992 | Klingel et al. ................... 219/121.82 |
| 5,273,422 | * | 12/1993 | Quin ...................................... 425/527 |
| 5,273,598 | * | 12/1993 | Higasihara et al. .................. 156/102 |
| 5,595,768 | * | 1/1997 | Treves et al. ...................... 425/174.4 |
| 5,597,590 | * | 1/1997 | Tanimoto et al. ................. 425/174.4 |

* cited by examiner

Primary Examiner—Nam Nguyen
Assistant Examiner—Joseph S Del Sole
(74) Attorney, Agent, or Firm—Ronald P. Kananen; Rader, Fishman & Grauer

(57) ABSTRACT

A disc of synthetic resin used for signal recording/reproduction by a head having floating slider, in which the disc substrate is deburred to removed defects in appearance and is improved in strength and quality, and the manufacturing apparatus for the disc substrate. The manufacturing apparatus includes a worktable for supporting the disc substrate in rotation, a positioning unit for positioning the disc substrate at a pre-set position on the worktable and a laser light source for illuminating the laser light on the disc substrate supported for rotation by the worktable. On the outer rim of the disc substrate is formed a raised portion not larger than 15 μm in height. The raised portion has a thickness larger than that of the outermost portion of the disc substrate.

13 Claims, 10 Drawing Sheets

APPARATUS FOR MANUFACTURING DISC SUBSTRATE

BACKGROUND OF THE INVENTION

1. Field of the Invention

This invention relates to a disc substrate of synthetic resin constituting a disc operating as a recording medium for information signals, such as a magnetic disc, an optical disc or a magneto-optical disc, and a method and apparatus for manufacturing the disc substrate. More particularly, it relates to a disc substrate of synthetic resin in which a head is mounted on a floating slider, with the head and the disc being arranged in close proximity to each other for realizing high-density recording/reproduction.

2. Related Art

In a disc, such as an optical disc, magneto-optical disc or a magnetic disc, a disc substrate is used which is molded from a synthetic resin material exhibiting light transmitting performance, such as polycarbonate resin. This disc substrate has an aperture at a mid portion thereof.

Usually, disc substrates are manufactured by injection molding. That is, in manufacturing the substrates, a substrate material, usually synthetic resin, is melted on heating, and injected under elevated pressure into a cavity corresponding in shape to the desired substrate shape. After cooling and curing of the substrate material, it is taken out from the cavity to manufacture the substrate of a desired shape.

Meanwhile, in usual injection molding, the inside of a metal mold is degassed.

However, since there are interstices in the outer and inner portions of the disc substrate molded in the metal mold, the resin is pulled by this degassing into these interstices to form burrs on the outer and inner portions. These burrs are extremely brittle and ready to break under the effect of various operations performed when taking out the disc substrate out of the metal mold. That is, the disc substrate is significantly lowered in strength in the outer and inner portions thereof due to the burrs formed thereon.

Thus, the disc substrate molded by injection molding experiences a problem that if, during transport of the disc substrate during inspection or assembling steps, a hand area of a transporting jig of the outer rim clamp or outer and/or inner rim vacuum handling system is contacted with the burrs on the outer and/or inner rims, these burrs are detached and turned into projection-like defect of the magnetic film thus lowering the quality of the disc substrate.

Moreover, if, after sputtering the magnetic layer on the disc substrate formed of synthetic resin, pressure is applied to the outer or inner rims of the disc substrate, the burrs on these outer or inner rims, if present, are broken and cracked, thus causing exfoliation due to absorbed or adsorbed water to lower the product quality.

The disc substrate formed of resin by injection molding suffers not only from the burrs, but from the so-called honing phenomenon in which the disc substrate is reduced in thickness as the outermost rim thereof is approached, as shown in FIG. 1. In the hard disc, a floating head is floated by approximately 50 mm relative to the disc surface and is moved substantially radially of the disc. Since the outer rim portion of the disc is of increased recording area and hence the recording area is preferentially set to as close to the outermost rim of the disc for increasing the recording capacity of the disc. Thus, the planar outer rim portion of the disc is desired for preventing the collision between the disc and the floating slider. Therefore, a smaller magnitude of the honing is desirable. In addition, from the convenience in designing the hard disc drive, this honing needs to be suppressed to within a prescribed magnitude. However, the honing tends to exceed the prescribed magnitude if burrs are formed on the disc substrate.

SUMMARY OF THE INVENTION

It is therefore an object of the present invention to provide a disc substrate of synthetic resin which is deburred to eliminate defects in appearance and which is of high quality with improved strength in outer and inner rims thereof.

In one aspect, the present invention provides a method for manufacturing a disc substrate including illuminating a laser light beam on at least the outer rim or the inner rim portions of a disc substrate of synthetic resin for at least transiently melting the illuminated portion, in which the disc substrate is such a disc substrate used for signal recording/reproduction by a head having a floating slider.

With the manufacturing method for the disc substrate according to the present invention, the laser light is illuminated on at least the outer or inner rim of the disc substrate for transiently melting the illuminated portion so that burrs produced during molding are removed or are immobilized against accidental removal for improving the strength of the disc substrate.

In another aspect, the present invention provides a apparatus for manufacturing a disc substrate including a worktable adapted for supporting a disc substrate and for being run in rotation, a positioning unit for positioning the disc substrate at a pre-set position on the worktable and a laser light source that is positioned to illuminate the laser light on at least the outer or inner rim portions of the disc substrate supported for rotation by the worktable. The positioning member is preferably inserted into a center opening in the disc substrate for positioning the disc substrate.

In the above-described manufacturing apparatus for the disc substrate according to the present invention, including the positioning unit for positioning the disc substrate on the worktable and the laser light source for illuminating the laser light on the disc substrate, the laser light can be illuminated on the appropriate positions on the disc substrate, so that the burrs on the disc substrate formed during molding can be efficiently removed or immobilized to eliminate defects in appearance to improve strength of the disc substrate.

In yet another aspect, the present invention provides a disc substrate of synthetic resin used for signal recording/reproduction by a head having a floating slider, wherein the disc substrate has a raised portion at an outer rim portion, with the thickness of the disc substrate at the raised portion being thicker than the thickness of the outermost rim of the disc substrate, with the raised portion being 15 $\mu$m or less in height.

With the above-described disc substrate of the present invention, having the raised portion on its outer rim portion, the disc substrate is increased in strength. The raised portion has a height not larger than 15 $\mu$m, so that the honing may be comprised in the allowable range in consideration of the fact that the floating head slider is caused to run radially of the disc from its outer rim portion towards its recording area.

With the manufacturing method for the disc substrate according to the present invention, having a step of illuminating the laser light on at least the outer or inner rim portion of the disc substrate 2 of synthetic resin for transiently melting the illuminated portion, the material of the disc substrate illuminated by the laser light beam is melted to remove burrs formed on the outer and/or inner rim portions of the disc substrate during injection molding so that there may be produced a disc substrate free of defects in appearance and which is also improved in quality and strength. With the manufacturing method for the disc substrate according to the present invention, the laser light is preferably illuminated n the disc substrate surface at an angle of 30° to 45°, in which case the burrs can be removed more efficiently and the disc substrate can be improved further in strength, while the yield in the manufacturing process may also be improved.

With the manufacturing apparatus for the disc substrate according to the present invention, the laser light can be illuminated on the correctly positioned disc substrate, thus enabling the burrs formed after injection molding to be removed efficiently. Moreover, a disc substrate may be provided which is freed of burrs and hence defects in appearance, and which is of high quality by being improved in strength in the outer rim portion as a result of laser light illumination. Also, the production yield of the production process is improved by employing the positioning mechanism capable of assuring correct positioning.

Also, the disc substrate of the present invention is improved in strength and superior in recording/reproducing characteristics because the thickness of the raised portion is within the allowable honing range. In addition, the disc substrate manufactured by the manufacturing method and apparatus of the present invention is improved in strength and moreover freed of burs so that it is of high quality and has no defects in appearance.

DESCRIPTION OF PREFERRED EMBODIMENTS

Figure 1:
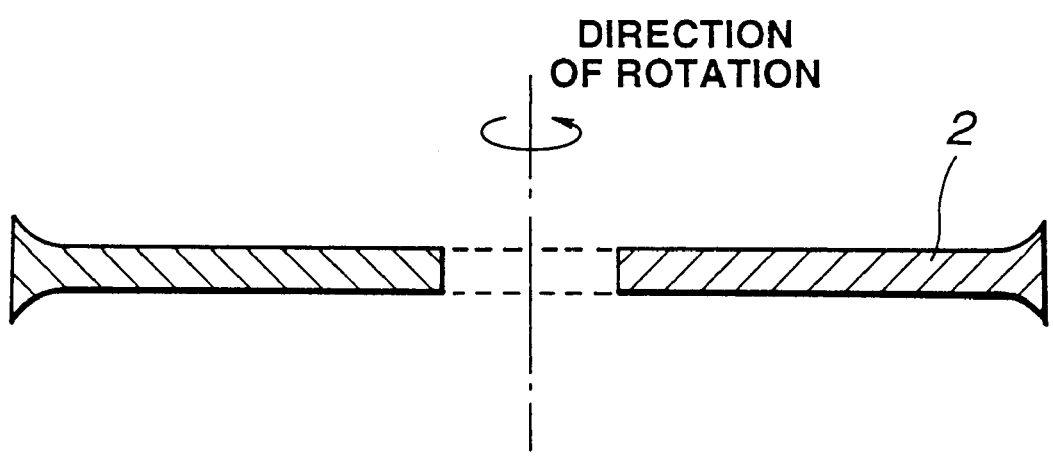
FIG. 1 is a cross-sectional view of a disc substrate for illustrating the honing.

Referring to the drawings, preferred embodiments of the present invention will be explained in detail.

Figure 2:
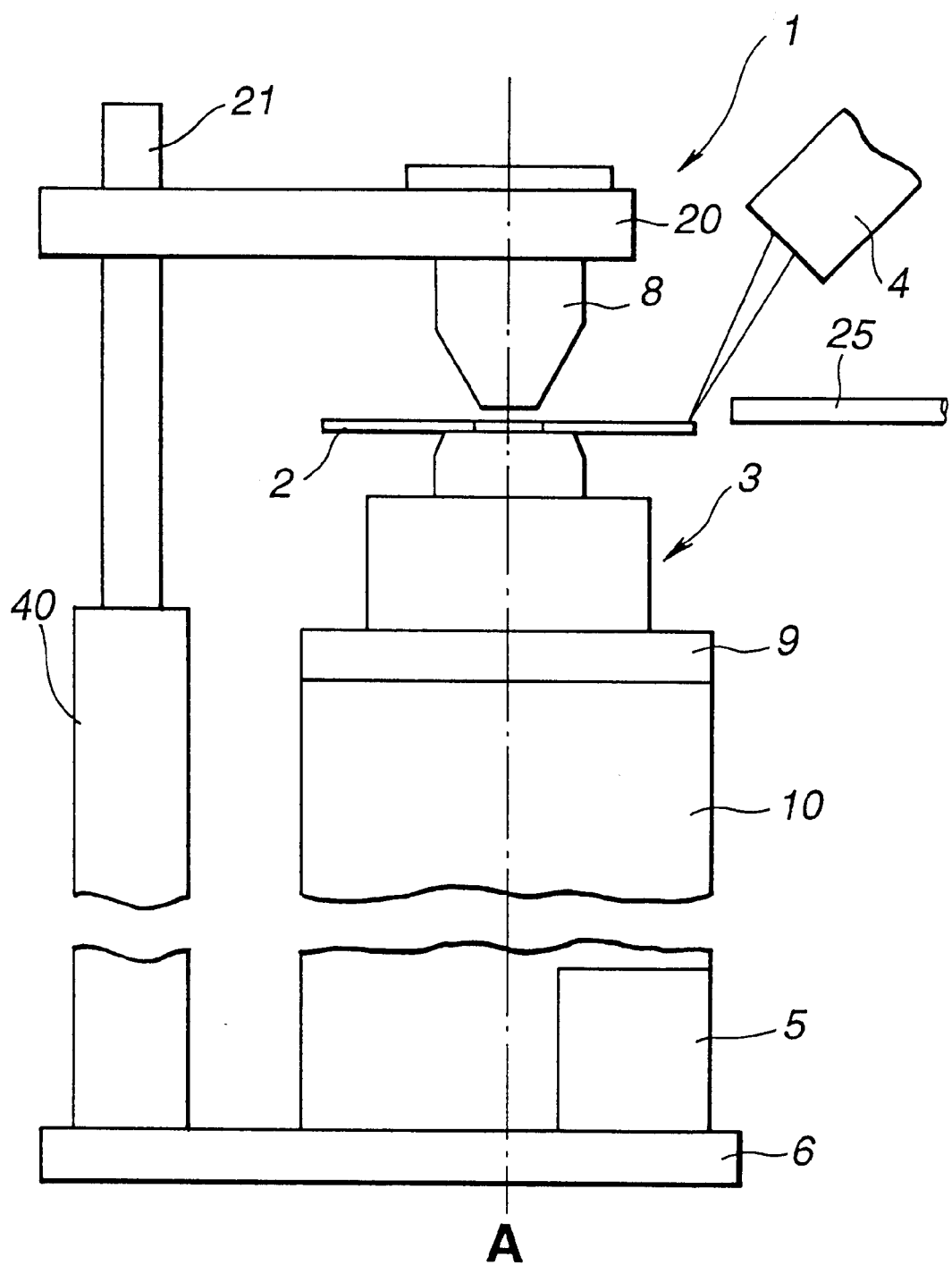
FIG. 2 is a front view showing an example of a manufacturing apparatus for a disc substrate according to the present invention.
Figure 3:
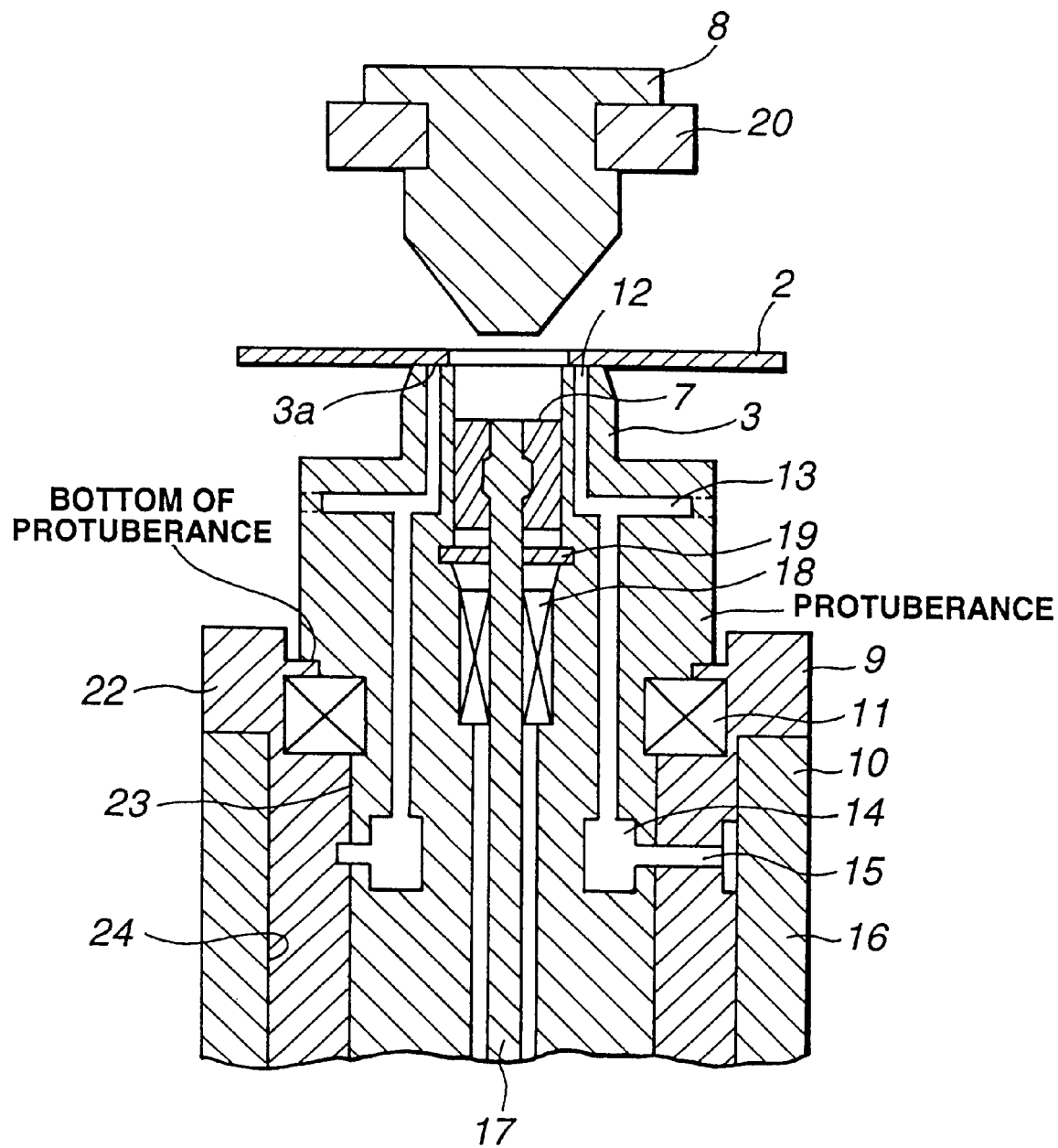
FIG. 3 is a cross-sectional view showing an example of a manufacturing apparatus for a disc substrate according to the present invention.
Figure 4:
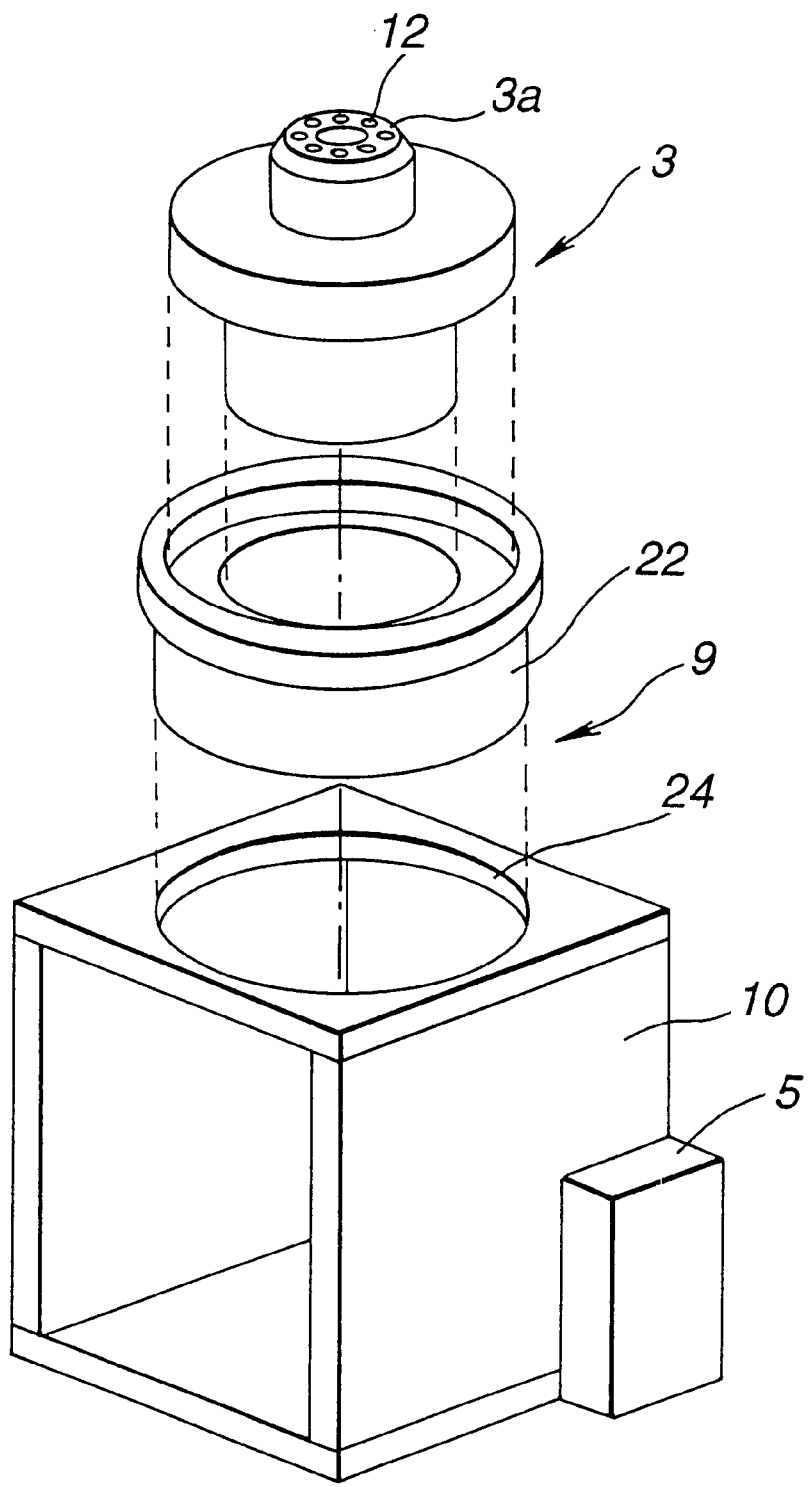
FIG. 4 is a schematic perspective view showing an example of a manufacturing apparatus for a disc substrate according to the present invention.

The manufacturing apparatus for a disc substrate according to the present invention is designed for illuminating a laser light beam on a disc substrate of synthetic resin, and is configured as shown in FIGS. 2 to 4. FIG. 2 is a front view of the manufacturing apparatus of the disc substrate according to the present invention, FIG. 3 is a cross-sectional view taken along line A of the manufacturing apparatus shown in FIG. 2 and FIG. 4 is a perspective view showing essential portions of the manufacturing apparatus.

The manufacturing apparatus 1 includes a worktable 3 for arranging and supporting a disc substrate 2, a positioning unit for setting the disc substrate 2 at a pre-set position on the worktable 3, a laser light source 4 for illuminating a laser light beam on the disc substrate 2, a base block for supporting the worktable 3 and a motor 5 mounted at a portion of the base block for rotationally driving the worktable 3. The base block carrying the worktable 3 and the motor 5 are arranged on a base plate 6.

The positioning unit is made up of a first positioning member 7 for arranging and positioning the disc substrate 2 at a pre-set position on the worktable 3 and for subsequently being detached from the disc substrate 2 and a second positioning member 8 for being inserted into a center aperture of the disc substrate 2 positioned by the first positioning member 7 and for subsequently being detached from the disc substrate 2.

The base block includes a first base block member 9 for supporting the worktable 3 and a second base block member 10 for supporting the first base block member 9.

The worktable 3 is comprised of a column on the top of which is formed a protuberance having a center opening traversed by the first positioning member 7 and a slide shaft 17 adapted for supporting the first positioning member. The worktable 3 also has a table surface 3a on the upper end of the protuberance. It is on this table surface 3a that the disc substrate 2 is arranged and positioned.

The worktable 3 also has a portion of its outer rim supported by the first base block member 9. The worktable 3 also has a bearing 11 arranged in a recess on the contact surface thereof with the first base block member 9 and is rotated by a motor 5. At this time, the disc substrate 2 is arranged on and supported by the worktable 3 so as to be rotated in synchronism with the worktable 3.

The worktable 3 also has a disc suction opening 12 in the table surface 3a which is a protuberant surface contacted with the disc substrate 2. This disc suction opening 12 is connected to an air suction duct 13 in the worktable 3 and to an air sink vessel 14 opening in a portion of the contact surface with the first base block member 9. This air sink vessel 14 is connected to an air communication duct 15 and to an air suction opening 16. The disc substrate 2, arranged on the table surface 3a, is sucked via disc suction opening 12, air suction duct 13, air sink vessel 14 and the air communication duct 15 to the air suction opening 16 by an ejector, not shown, so as to be immobilized on the table surface 3a.

There are provided eight disc suction openings 12 in the surface of the disc substrate 2 for uniformly sucking the disc substrate 2. It is noted that any optional number of the disc suction openings 12 may be provided if these openings can suck the disc substrate 2 uniformly.

The air sink vessel 14 unifies the eight disc suction openings 12 and the air suction duct 13 contiguous thereto into one to form a ring-like structure. Consequently, this air sink vessel 14 can collect air streams from the eight disc suction openings 12 to form a homogeneous air stream thus enabling the disc substrate 2 to be sucked by an ejector, not shown.

The positioning unit is made up of the first positioning member 7 and the second positioning member 8, as described above.

The first positioning member 7 is mounted at an end of a slide shaft 17 and is adapted to be slid vertically of the disc substrate 2 by a cylinder, not shown. At this time, the slide shaft 17 is carried by a linear bushing 18 arranged in a portion of the outer rim of the shaft. This first positioning member 7 is adapted for transporting the disc substrate 2 arranged on its surface, as will be explained subsequently, for arraying the transported disc substrate 2 at a pre-set position on the worktable 3 for positioning the disc substrate 2. A linear bush stop ring 19 is mounted on the upper end of the linear bushing 18.

The second positioning member 8 is supported by a supporting bracket 20 mounted on a height adjustment shaft 21. This height adjustment shaft 21 has its side opposite to the side carrying the supporting bracket 20 connected to a cylinder 40. Thus, the second positioning member 8 can be slid vertically of the surface of the disc substrate 2. This second positioning member 8 is adapted for re-positioning the disc substrate 2 by being inserted into the center aperture of the disc substrate 2 arranged at a pre-set position on the table surface 3a by the first positioning member 7.

In particular, the positioning by the second positioning member 8 is the re-positioning aimed at suppressing the offset of the disc substrate 2 within the allowable range. This second positioning member 8 permits more accurate positioning of the disc substrate 2 at the pe-set position to enable the burrs to be removed efficiently by illumination of the laser light. The positioning mechanism of these positioning members will be explained subsequently.

The base block is made up of the first base block member 9 and the second base block member 10, as described above. The first base block member 9 is comprised of a column carrying a disk-shaped base block table section 22 and has a center opening 23 in which is inserted the column of the worktable 3, as shown in FIG. 4. The base block table section 22 is adapted for directly supporting the worktable 3. The first base block member 9 has a bearing 11 on its inner lateral surface contacting with the worktable 3 for supporting the workable 3 adapted for being rotated about the slide shaft 17 as the center of rotation. Meanwhile, the first base block member 9 remains fixed at all times.

The first base block member 9 is provided with the air communication duct 15, connecting to the air sink vessel 14 arranged on the worktable 3, for extending along the thickness of the first base block member 9 for being connected to the air suction opening 16 formed on the outer lateral surface of the first base block member 9. The disc substrate 2 is sucked by this air communication duct 15 by the ejector, not shown, via the air sink vessel 14, air suction duct 13 and the disc suction opening 12.

The second base block member 10 is used for supporting the first base block member 9 in turn adapted for supporting the worktable 3. The second base block member 10 has, in its surface contacted with the first base block member 9, a center opening 24 in which is inserted the columnar portion of the first base block member 9. The second base block member 10 also has its both lateral surfaces designed to cover portions of the worktable 3 and the first base block member 9. On the lateral surface of the second base block member 10 are mounted major portions of the motor 5. The motor 5 has its belt, not shown, connected to the worktable, and is adapted for rotationally driving the worktable 3.

The second base block member 10 need not be rectangular in shape as shown in FIG. 4, but may be of any suitable shape if it can secure the worktable 3 and can enclose the belt of the motor 5. Thus, the second base block member 10 may be unified in structure with the first base block member 9. Moreover, the motor 5 may be positioned in the base block, that is, the belt of the motor 5, which drives the worktable 3, may be enclosed in the base block.

The laser light source is preferably a $CO_2$ laser, but may be any other suitable laser provided that it can machine the work without being transmitted through the transparent substrate and that it has an oscillation wavelength of the infrared range. If the substrate is not transparent, it is possible to use other laser light sources. The laser light source 4 is movable to permit adjustment of the angle of illumination on the disc substrate 2 in a desired manner. Although the laser light source 4 may itself be rotated instead of rotating the disc substrate 2, it is more preferred for the laser light source 4 to be adjusted only with reference to the illuminating angle, as the disc substrate is rotated, in consideration of the efficiency in the manufacturing process.

The laser light source 4 according to the present invention is adapted for being illuminated on the outer rim of the disc substrate 2 for melting the material of the disc substrate and for partially vaporizing the melted material for removing the burrs formed on the outer rim of the disc substrate 2. In particular, for illuminating the laser light to the outer rim of the disc substrate 2 from the laser light source 4, the laser light is preferably illuminated at an angle of 30° to 40° relative to the surface of the disc substrate 2.

In the vicinity of the portion of the disc substrate 2 illuminated by the laser light from the laser light source 4 is arranged a suction unit exemplified by a vacuum tube 25. This vacuum tube 25 is arranged for removing vaporization products yielded on melting and vaporization of the substrate material by illumination of the laser light. This vacuum tube 25 is also movable freely. This vacuum tube is also preferably arranged in the vicinity of the laser light source 4 so as to follow up with the laser light source 4. If the laser light source 4 is designed to be of the rotatable type, as described above, the vacuum tube 25 may also be designed to be rotatable in keeping up with the laser light source 4.

The laser light from the laser light source 4 may also be illuminated not only on the outer rim but also on the inner rim of the disc substrate 2. This enables the burrs formed on the inner rim of the disc to be removed.

Figure 5:
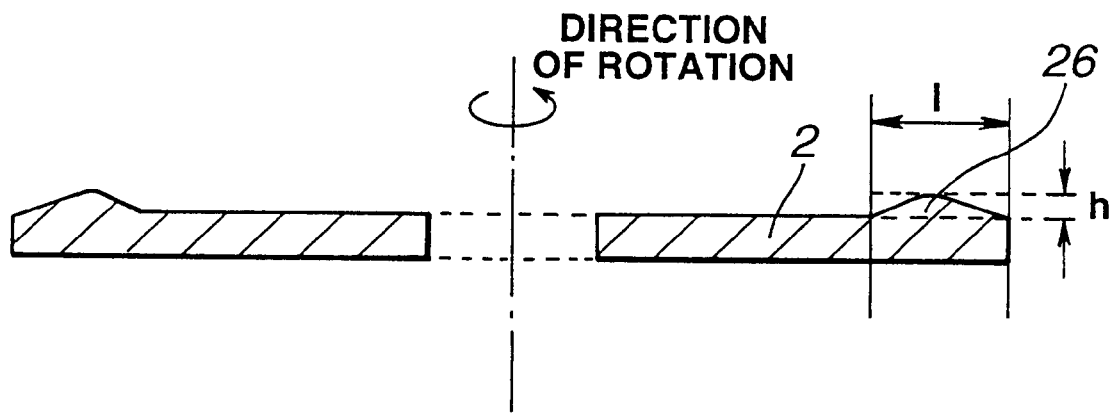
FIG. 5 is a cross-sectional view showing an example of a disc substrate according to the present invention.

If the disc substrate 2, irradiated with the laser light from the laser light source 4, has its outer rim irradiated with the laser light, there is formed a raised portion 26 on the outer rim of the disc substrate 2, with the height h of the raised portion 26 being not larger than 15 μm, as shown in FIG. 5.

It should be noted that the thickness of the disc substrate 2 in the area thereof having the raised portion 26 is selected to be thicker than the thickness of the outer most rim of the disc substrate 2 to avoid the situation in which the thickness of the outer most rim of the disc substrate is thicker than that of the other portions, as shown in FIG. 1. The width of the raised portion 26 of the disc substrate 2 is preferably not larger than 0.5 mm taking into account the area-matching with the recording area.

Moreover, the laser light is illuminated on the outer rim of the disc substrate 2 for eliminating the burrs formed on the outer rim of the disc substrate. Also, by illuminating the laser light on the outer rim of the disc substrate, the burrs formed on the outer rim can be removed. In addition, this thickness h can be suppressed so as to be within the tolerable range of honing desirable for recording/reproduction. It is noted that, if the laser light is illuminated on the inner rim of the disc substrate 2, the burrs formed on the inner rim can be removed.

Meanwhile, even if the height h of the raised portion 16 exceeds 15 µm, or if the burrs are not completely removed, the angle of incidence of the laser light on the disc substrate 2 need not be 30° to 45° provided that the operating condition is not such as to allow for detachment of the disc substrate 2, that is that the operating conditions are moderate.

Thus, the disc substrate 2, manufactured by the disc substrate manufacturing apparatus according to the present invention and the manufacturing method as later explained, is improved in strength because it is deburred or safeguarded against detachment, while in addition the raised portion 26 of a moderate thickness is formed on the outer rim of the disc substrate by radiating the laser light to the outer rim of the disc substrate 2. Meanwhile, if the laser light is illuminated on both sides of the disc substrate 2, the raised portion 26 is formed on each side of the disc.

The method for manufacturing the disc substrate 2 using the above-described manufacturing apparatus for the disc substrate is hereinafter explained. The manufacturing method for the disc substrate has the first positioning step, a second positioning step and a laser light illuminating step.

Figure 6:
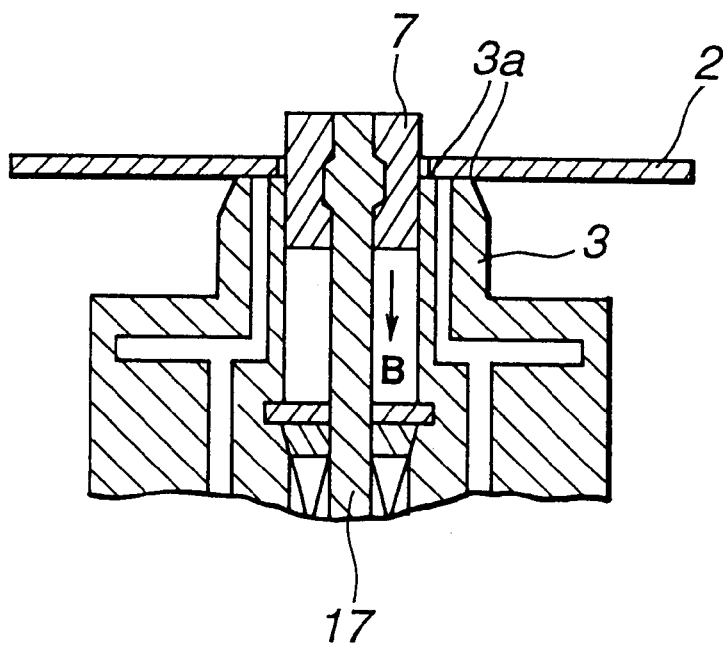
FIG. 6 is a first schematic view for illustrating the operation of a manufacturing apparatus of the disc substrate according to the present invention.
Figure 7:
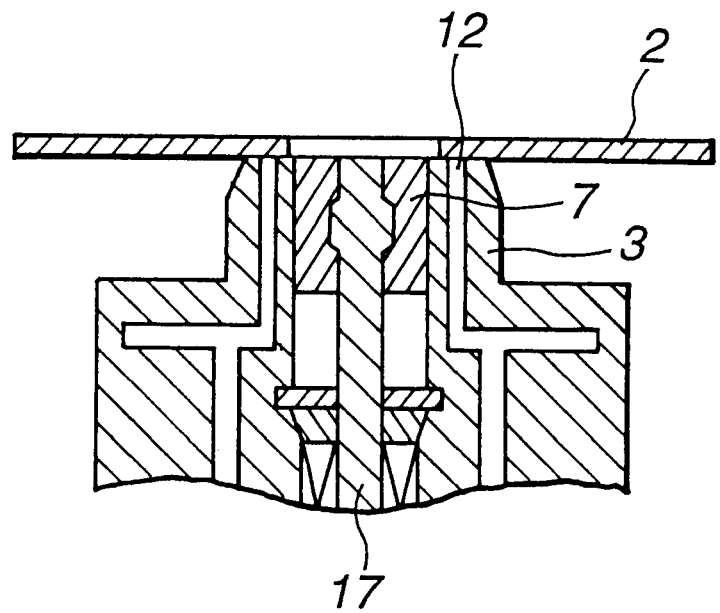
FIG. 7 is a second schematic view for illustrating the operation of a manufacturing apparatus of the disc substrate according to the present invention.

In the first positioning step, the disc substrate 2 of synthetic resin molded by, for example, injection molding, is placed on the first positioning member 7, as shown in FIG. 6. At this time, the first positioning member 7 is projected upwards from the table surface 3a of the worktable 3. The first positioning member 7 supporting the disc substrate 2 is moved in the direction of the worktable 3, that is in the direction as indicated by arrow B in FIG. 6, as a result of movement of the slide shaft 17. It is noted that the slide shaft 17 is driven by the cylinder.

Figure 8:
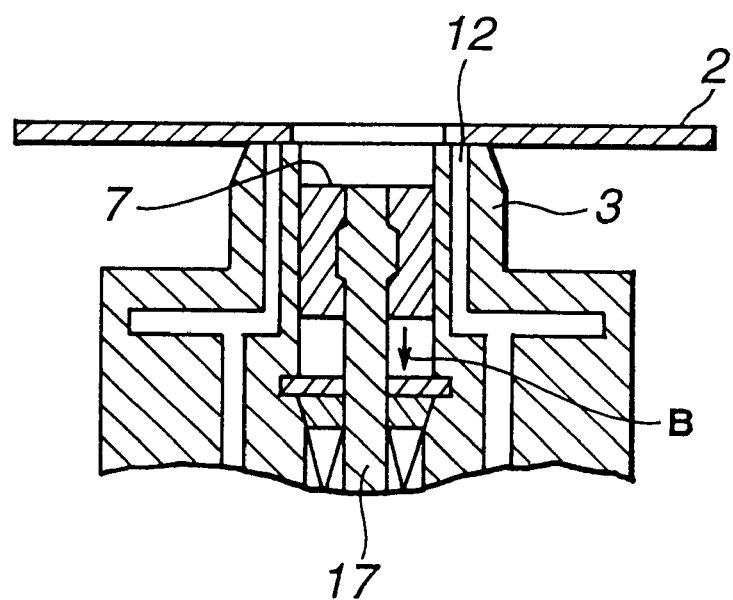
FIG. 8 is a third schematic view for illustrating the operation of a manufacturing apparatus of the disc substrate according to the present invention.

The result is that the disc substrate 2 is positioned on the table surface 3a. The slide shaft 17 is moved further in the direction of arrow B as shown in FIG. 8.

The above-described process is the first positioning process.

Figure 9:
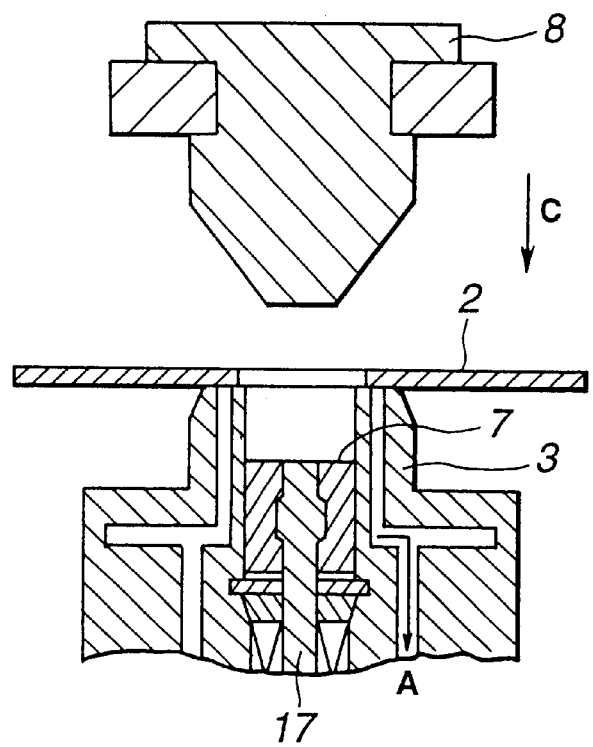
FIG. 9 is a fourth schematic view for illustrating the operation of a manufacturing apparatus of the disc substrate according to the present invention.

Then, in the second positioning process, the second positioning member 8 is moved towards the disc substrate 2 in the direction indicated by arrow C in FIG. 9. At this time, the second positioning member 8 is supported by the supporting bracket 20 mounted on the height adjustment shaft 21 so as to be moved by the cylinder, not shown, as a driving source.

Figure 10:
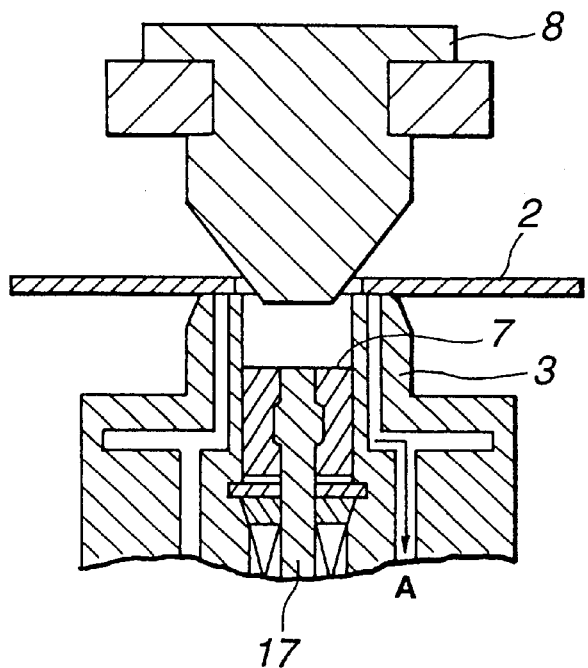
FIG. 10 is a fifth schematic view for illustrating the operation of a manufacturing apparatus of the disc substrate according to the present invention.

The second positioning member 8 then is contacted with the disc substrate 2 for re-positioning, as shown in FIG. 10. The disc substrate 2 is sucked by an ejector, not shown, in the direction indicated by arrow A in FIG. 10 via the air suction opening 13, so as to be immobilized in position.

Figure 11:
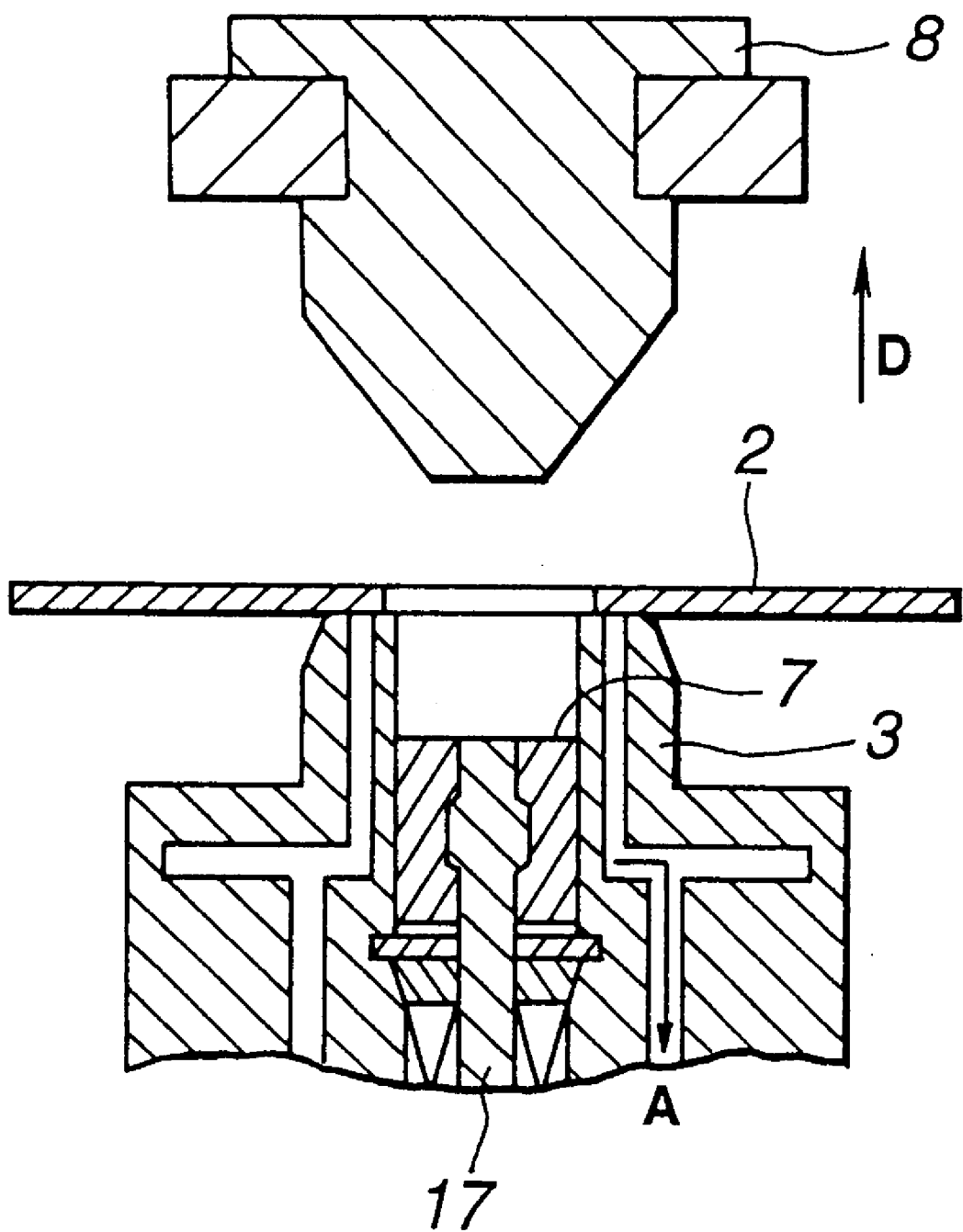
FIG. 11 is a sixth schematic view for illustrating the operation of a manufacturing apparatus of the disc substrate according to the present invention.

The second positioning member 8 is then moved in the direction indicated by arrow D in FIG. 11 so as to be detached from the disc substrate 2. This ultimately positions the disc substrate 2.

The above-described process ins the second positioning process which is the ultimate positioning process.

Figure 12:
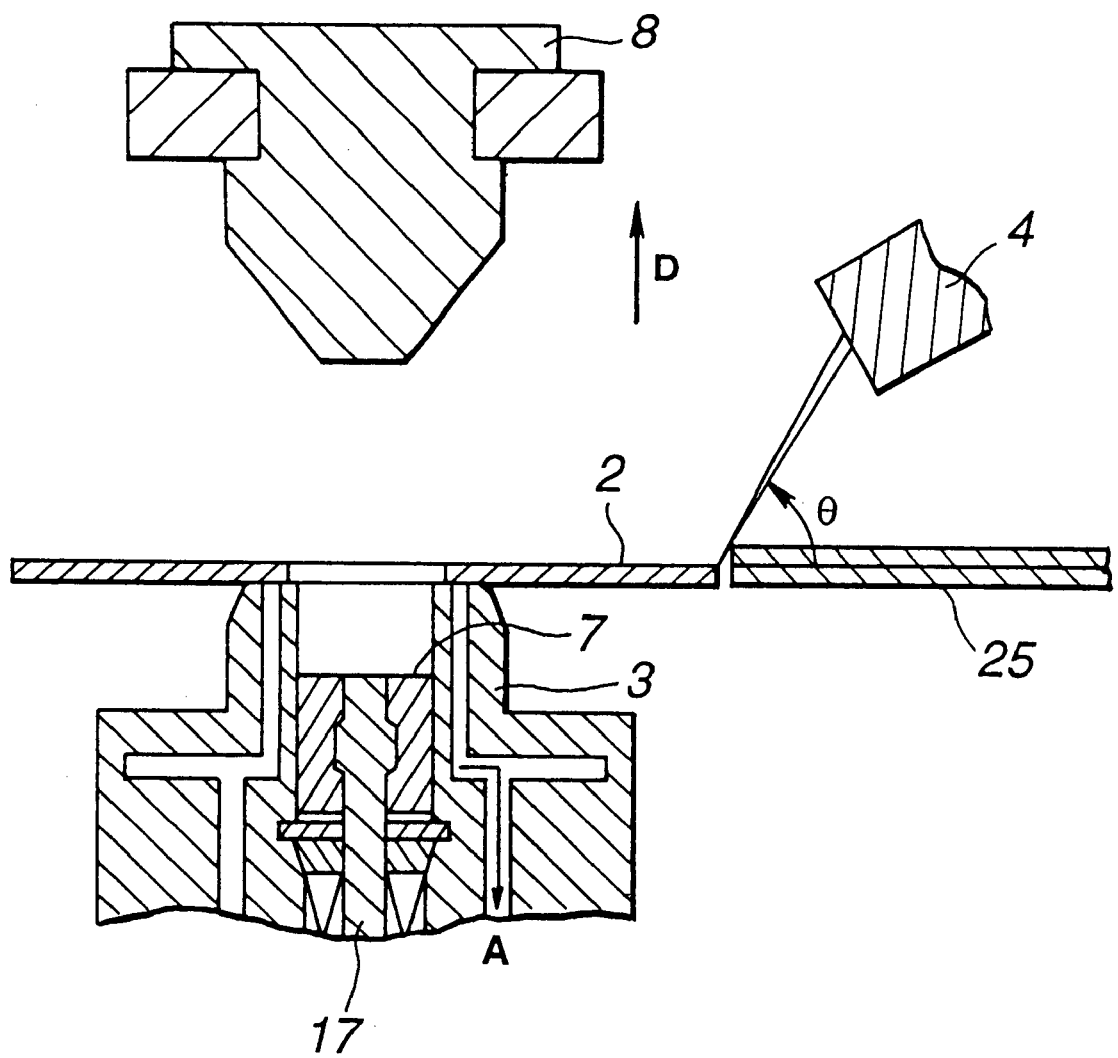
FIG. 12 is a seventh schematic view for illustrating the operation of a manufacturing apparatus of the disc substrate according to the present invention.

Finally, the laser light beam is illuminated on the outer rim of the disc substrate 2 from the laser light source 4 arranged in the vicinity of the manufacturing apparatus for the disc substrate 2, as shown in FIG. 12. If the laser light is illuminated on the outer rim of the disc substrate 2, the laser light is preferably illuminated so that an angle θ relative to the surface of the disc substrate 2 shown in FIG. 12 will be 30° to 45°.

In the vicinity of a illuminating point of the laser light on the disc substrate 2, illuminated on the disc substrate 2, there is arranged a vacuum tube 25 adapted for sucking products yielded on evaporation of the material of the disc substrate 2 caused by illumination of the laser light from the vacuum tube 25.

If the disc substrate 2, illuminated with the laser light at an angle of 30° to 45°, a raised portion 26 is formed on the outer rim towards the outside of the disc substrate 2, as shown in FIG. 5, with the height h of the raised portion 26 being not larger than 15 µm. The thickness of the disc substrate 2 formed with the raised portion 26 is set so as to be thicker than that of the outermost area of the disc substrate 2.

Moreover, since the material of the irradiated portion of the substrate is melted as result of illumination of the laser light, the disc substrate 2 is deburred. Meanwhile, in the above-described first and second positioning steps and in the laser light illuminating process, the disc substrate 2 is sucked via the disc suction opening 12 at all times.

Thus, the disc substrate 2, manufactured by the manufacturing method and apparatus for the disc substrate according to the present invention is deburred, presents no defect in appearance by being safeguarded against detachment, and has a moderate thickness at the outer rim when the laser light is illuminated thereon, so that it is improved in strength and of high quality.

Meanwhile, it is only sufficient if the disc substrate 2 is formed of synthetic resin by injection molding and is usable as a substrate for a disc used for recording information signals, such as a magnetic disc, an optical disc or a magneto-optical disc.

EXAMPLES

The present invention will be explained in detail with reference to Examples based on specified experimental results.

Example 1

As a disc substrate of synthetic resin, fresh from the injection molding process, a burred disc substrate having a width from the outer most rim of 100 µm and a maximum thickness from the surface of the disc substrate of 50 µm was prepared.

This disc substrate was illuminated by a laser light source under the conditions of the laser spot diameters of 1.3 mm and 2.2 mm, the rpm of the disc of 30, 60, 90 and 120, the laser light illumination intensity of 4.7 W to 12.6 W, the laser light illuminating time durations of 1 sec and 2 sec and the illuminating angles θ of the laser light beams of 30°, 45°, 65° and 90°.

The disc substrates, thus illuminated with the laser light, were checked as to whether or not the disc substrate has been deburred, and researches were conducted into illuminating conditions suitable for deburring.

It was found that burs formed on the outer rim of the disc substrate illuminated by the laser light were removed under conditions of the laser spot diameters of 1.3 mm and, 2.2 mm, the rpm of the disc of 30, the laser light illumination intensity of $13.7 \times {}^{30}\!/_{87}$ W to $13.7 \times {}^{80}\!/_{87}$ W, the laser light illuminating time durations of 2 sec and the illuminating angle θ of the laser light beams of 30° or 45°. The above conditions were used as the suitable illuminating conditions for deburring.

Meanwhile, if the $CO_2$ laser is illuminated as described above, the irradiated portion by the laser light forms a raised portion after melting. This phenomenon has the effect of improving the intensity of the outer rim of the molded substrate. On the other hand, it may occur that this protuberance exceeds the tolerable range for honing. There are also occasions wherein the laser light is not illuminated in the range of burs under the effect of disc eccentricity such that burrs are left, or that, depending on the processing conditions, the melted portion of the laser light illumination sags to cause defects in appearance.

Thus, using an optical microscope, the range of conditions in which there is no burr or sag in the illuminated portion of the laser light was identified and measurements were made of the width L of the raised portion after laser light irradiation and the maximum thickness h thereof using a contact type optical microscope for investigating into an optimum condition of the laser light for deburring.

Table 1 shows the measurement results. For a disc substrate in which there is no burr or sag after laser light illumination and in which the thickness h of the raised portion is within the range of 15 μm when the allowable honing range is 15 μm, the width L and the maximum thickness h of the raised portion after laser light illumination shown.

It may be said that, if measured values are not indicated in Table 1, burs are left or sag is produced or the maximum thickness h of the raised portion of the disc substrate exceeds 15 μm even after laser light illumination.

It is also seen that, with the laser spot diameter of 1.3 mm, disc rpm of 30, laser light illuminating time duration of 2 sec and the laser light illuminating angle θ of 45°, the range of allowable values of the laser power and the amount of eccentricity that allow for deburring and the thickness h of the raised portion 15 μm or less is broad to render it possible to remove burrs more stably than under other conditions.

It is also seen that, if the illuminating angle θ is 30°, the optimum range of the laser power is narrow, however, the raised portion can be reduced in thickness.

Example 2

Research was then conducted into changes in intensity by irradiation of the laser light.

First, as disc substrates fresh from the injection molding, disc substrates having burrs similar to those in Example 1 were prepared.

Of the above disc substrates, a disc substrate S-1 illuminated by the laser light and a disc substrate S-2 not illuminated by the laser light were prepared. By way of laser light illuminating conditions, the laser spot diameters, disc rpm, laser power representing the laser spot, laser light illuminating time duration and the laser light illuminating angle θ were set to 1.3 mm, 30 rpm, 7.7 W, 2 sec and 45°, respectively.

The disc substrate S-1, illuminated by the laser light under the above conditions, was deburred, with the maximum thickness of the raised portion being 15 μm.

Figure 13:
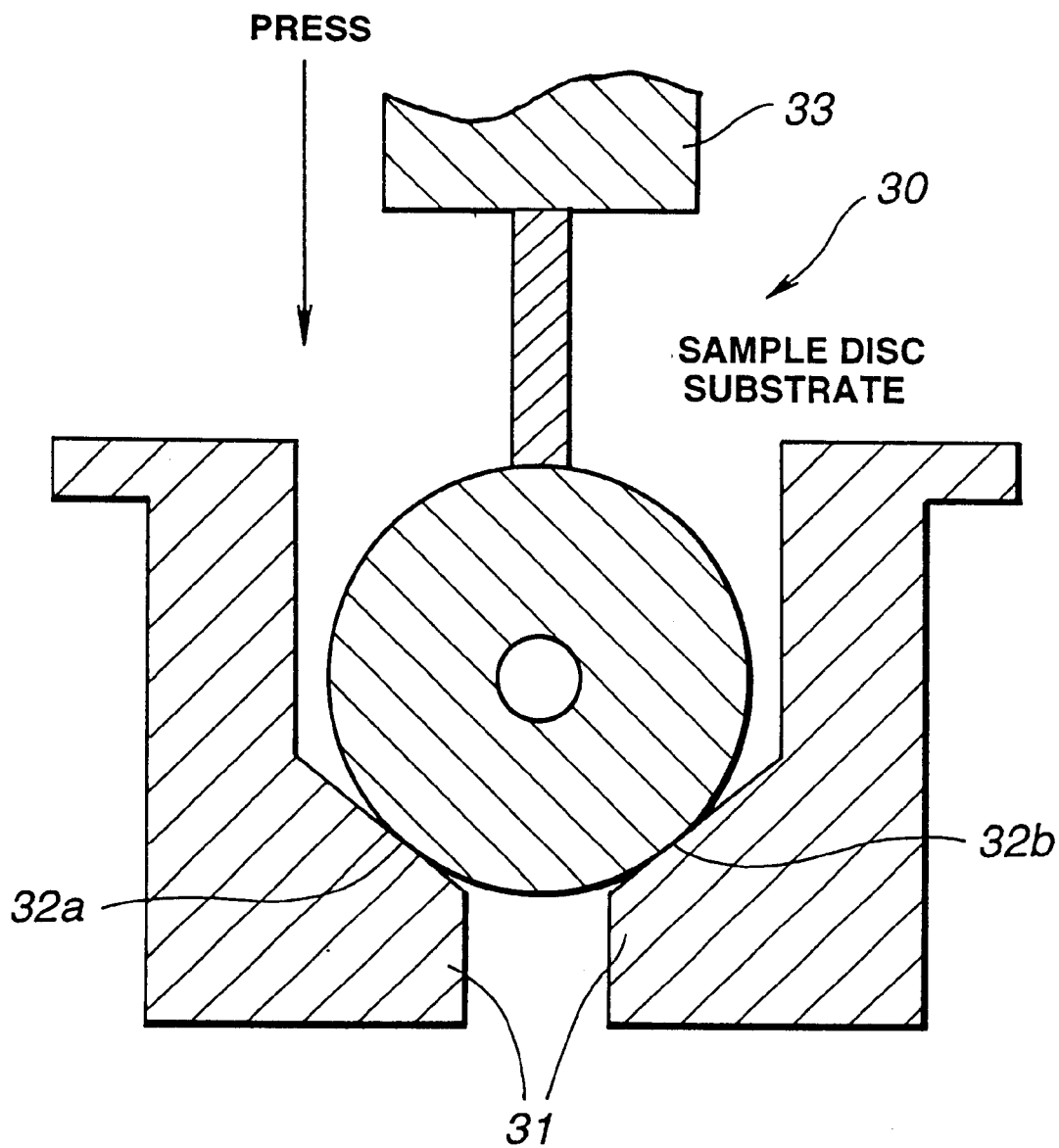
FIG. 13 is a schematic view for illustrating an example of a pressing device used in an embodiment of the present invention.

Of the disc substrate S-1 illuminated by the laser light and the disc substrate S-2 not illuminated by the laser light, the strength of the disc substrates was measured, after sputtering a magnetic film by the following method:

Using the pressing device 30 shown in FIG. 13, the disc substrates 2 were arranged in a cassette 31 and held at two points 32a, 32b. Using a tension gauge, the disc substrates were pressed by 100 gf. After the pressing at 100 gf was continued for 10 sec, the disc substrates 2 were checked as to the absence of cracks or bursts. The pressure was similarly increased and maintained for the same time duration in order to check that the disc substrates were free of cracks or bursts.

| | | $CO^2$ laser working condition (t = 2 sec, m (common value) = 30 rpm | | | | | |
|---|---|---|---|---|---|---|---|
| | | θ = 30°, d = φ1.3 mm | | θ = 45°, d = φ1.3 mm | | θ = 45°, d = φ2.2 mm | |
| laser power | size of raised portion | range | tolerable offset | range | tolerable offset | range | tolerable offset |
| 12.6 W | h (μm) | — | — | — | — | — | — |
| | l (mm) | — | — | — | — | — | — |
| 11.0 W | h (μm) | — | — | — | — | 35960 | — |
| | l (mm) | — | — | — | — | 0.28–0.41 | — |
| 9.4 W | h (μm) | 36071 | — | 36082 | — | 36136 | — |
| | l (mm) | 0.45–0.56 | 0.11 | 0.33–0.48 | 0.15 | 0.23–0.30 | 0.07 |
| 7.9 W | h (μm) | — | — | 36013 | — | 36107 | — |
| | l (mm) | — | — | 0.37–0.45 | 0.08 | 0.20–0.24 | 0.04 |
| 6.3 W | h (μm) | — | — | 35949 | — | — | — |
| | l (mm) | — | — | 0.34–0.46 | 0.12 | — | — |
| 4.7 W | h (μm) | — | — | 36103 | — | — | — |
| | l (mm) | — | — | 0.22–0.22 | 0.11 | — | — |

It is seen from the results of FIG. 1 that, for the laser light illuminating angle ranging between 30° and 45°, burrs can be removed, while the thickness h of the raised portion of the melted portion can be reduced to 15 μm or less.

The pressing was discontinued at a time point cracks or bursts were noticed. The pressure prevailing at this time was defined as the strength of the disc substrate.

The above results are shown in table 2.

TABLE 2

| number of times of test | S-1 | S-2 |
|---|---|---|
| first | 900 gf | 100 gf |
| second | 2000 gf | 100 gf |

It is seen from Table 2 that, with the disc substrate S-1 illuminated by the laser light beam, cracks were noticed at 900 gf and at 2000 gf for the first and second measurements, respectively. On the other hand, with the disc substrate S-2 not illuminated by the laser light, cracks were noticed at 100 gf for both the first and second measurements.

It is seen from this that raised portions were noticed on the outer rim of a disc substrate illuminated by the laser light at the outer rim in particular, and that this raised portion contributed to increased strength.

Although the disc substrates S-1 and S-2 showed a wide difference in the pressure magnitudes for the first and second measurements, this difference is thought to be an error insignificant as compared to the disc substrate S-2 not illuminated by the laser light.

What is claimed is:

1. An apparatus for manufacturing a disc substrate comprising:
   a rotating worktable that is structurally adapted to support and rotate an optical disc substrate of synthetic resin;
   a laser light source that is positioned to illuminate the laser light on at least an outer rim portion or an inner rim portion of the disc substrate that is supported and rotated by said worktable; and
   a positioning unit, for positioning the disc substrate at a pre-set position on the worktable, which comprises:
      a first positioning member that is inserted in a center opening formed in the disc substrate, and is of a width that causes the disc substrate to be positioned about an allowable range that encompasses said pre-set position; and
      a second positioning member that is inserted into the center aperture of the disc substrate and repositions the disc substrate to said pre-set position.

2. The apparatus as claimed in claim 1, wherein the laser light source illuminates the laser light at an angle of 30° to 45° on a surface of the disc substrate.

3. The apparatus as claimed in claim 1, wherein the worktable has a disc suction opening for sucking and immobilizing the disc substrate.

4. The apparatus as claimed in claim 1, further comprising:
   suction means for sucking a product formed on evaporation of the material of the disc substrate as a result of illumination of the laser light.

5. The apparatus as claimed in claim 1, wherein the laser light source illuminates the laser light on the outer rim portion of the disc substrate for forming a raised portion 15 $\mu$m or less in height on the outer rim portion of the disc substrate.

6. The apparatus as claimed in claim 1, wherein the laser light from said laser light source produces a laser light of a strength to melt a burr formed of said synthetic resin on said disc substrate.

7. The apparatus as claimed in claim 1, wherein said laser light source produces a $CO_2$ laser.

8. The apparatus as claimed in claim 1, further comprising:
   a vacuum tube, disposed near a portion of said disc substrate that is illuminated by said laser light, to remove vaporization products yielded on melting and vaporization of said synthetic resin as a result of illuminating said laser light on said disc substrate.

9. The apparatus as claimed in claim 1, wherein the worktable has a plurality of disc suction openings for sucking and immobilizing the disc substrate.

10. The apparatus as claimed in claim 1, wherein said first positioning member is mounted to a slide shaft that is disposed within an opening in said worktable.

11. The apparatus as claimed in claim 10, wherein said slide shaft slides said first positioning member toward said worktable and into said center opening of said disc substrate.

12. The apparatus as claimed in claim 1, wherein said second positioning member is mounted above said worktable and supported by a height adjustment shaft.

13. The apparatus as claimed in claim 12, wherein said height adjustment shaft moves said second positioning member toward said worktable and into said center opening of said disc substrate.

* * * * *